July 5, 1932.      R. J. NORTON      1,866,419
BRAKE
Filed March 15, 1929

Inventor
RAYMOND J NORTON
By Semmes & Semmes
Attorneys

Patented July 5, 1932

1,866,419

UNITED STATES PATENT OFFICE

RAYMOND J. NORTON, OF WASHINGTON, DISTRICT OF COLUMBIA, ASSIGNOR TO BENDIX BRAKE COMPANY, OF SOUTH BEND, INDIANA, A CORPORATION OF ILLINOIS

BRAKE

Application filed March 15, 1929. Serial No. 347,395.

This invention relates in general to automotive vehicle brakes and more particularly has reference to the mechanism for actuating the means for engaging the brake drum to retard rotation thereof.

Brake mechanism of various constructions have been perfected. One type of brake having many desirable features and advantages over other types is that employing an internal expanding braking element. Under certain conditions it has been found that brake construction of this type and also brake construction of other types have a tendency to grab or chatter when applied. That is the lining carried by the braking element grabs the drum to lock the drum against rotation or successively grabs and releases the drum causing a chatter. These effects are disagreeable to the driver and reduce the efficiency of the braking system.

A major object of this invention is to devise a brake construction which will eliminate the disadvantageous chattering and grabbing effects produced by the application of present braking mechanisms.

Another object of this invention is to provide a brake element actuating device which will permit the brake element to automatically release its grip on the drum at the outset of the grabbing action.

Yet another object of this invention is to provide a device for actuating an expansible brake element which will collapse under predetermined conditions.

Still another object of this invention is to provide a brake element actuating device in the form of a collapsible wedge.

A still further object of the invention is to associate a device with the braking element of a vehicle brake which will collapse under predetermined conditions to prevent grabbing or chattering of the brake mechanism.

With these and other objects in view which may be incident to my improvements, the invention consists in the parts and combinations to be hereinafter set forth and claimed, with the understanding that the several necessary elements comprising my invention, may be varied in construction, proportions and arrangement, without departing from the spirit and scope of the appended claims.

The present invention deals with the elimination of grabbing and chattering by associating a resilient device with the braking element to permit the latter to release its grip on the brake drum at the outset of the grabbing or chattering action. One method of practically effecting the concept of this invention is to provide a device for actuating the braking element, which is collapsible under predetermined actuating and/or reaction forces to relieve the excessive pressure between braking element and the drum. A preferred embodiment of this invention is in the form of a wedge formed of pivoted members normally held in wedge formation by means, yieldable to permit the angle of the wedge to become more acute and thereby allow the braking element to contract to relieve its grip on the drum.

In order to make my invention more clearly understood, I have shown in the accompanying drawing me ns for carrying the same int practical ect, without limiting the improvements in their useful applications to the particular constructions, which for the purpose of explanation, have been made the subject of illustration.

Figure 1:
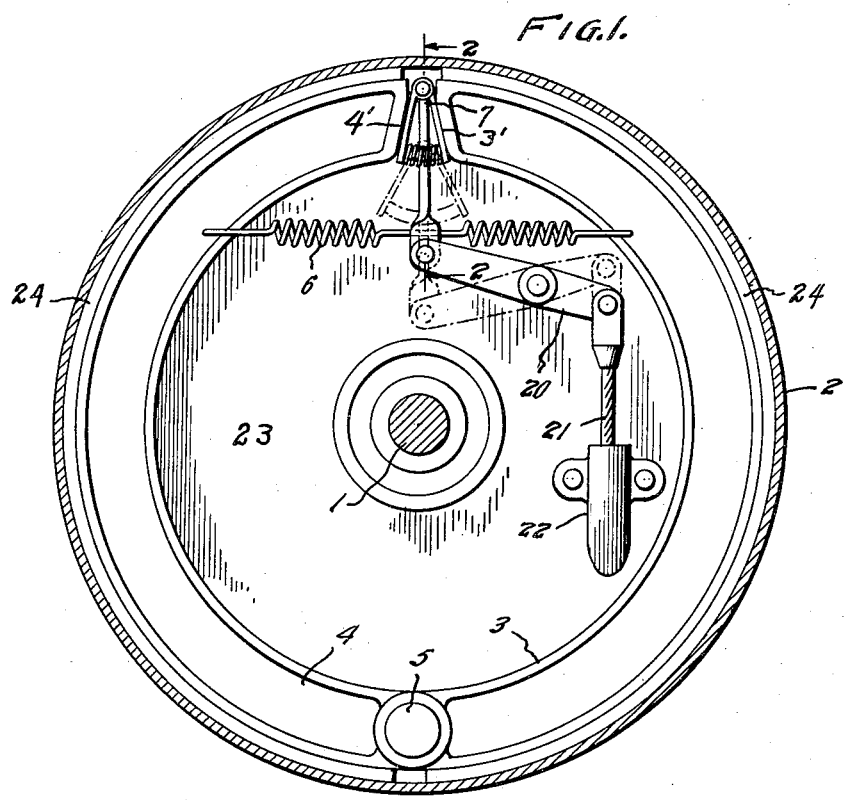
Figure 1 is a sectional view through the brake drum showing the manner in which the collapsible actuating device is associated with the braking element.

Referring to the drawing, in which similar reference characters designate similar parts throughout the several views of the drawing, there is shown a shaft 1 of an automotive vehicle with which is associated a brake drum 2. The drum 2 may be attached directly to the shaft 1 when the structure is employed as a drive shaft brake, or the drum 2 may be carried by a wheel not shown, which is mounted on the shaft or axle 1.

A backing plate 23 is secured to a non-rotatable portion of the vehicle. This plate carries or is associated with an anchor pin 5. Pivotally mounted on the anchor pin 5 are brake elements or shoes 3 and 4 equipped with suitable lining 24. For purposes of illustration a brake construction employing two internal shoes has been shown in the drawing, but it will be obvious other particular brake structures may be employed.

As shown in Figure 1 the end faces 3' and 4' of the brake elements are slightly tapered so as to cooperate with the faces of an actuating wedge 7. In accordance with the present invention the wedge consists of a pair of plates 9 and 10 pivoted on a pin 8 carried by a supporting and actuating link or rod 11. Each of the plates or members 9 and 10 carries arcuate slotted arms 12 and 13 respectively. These slotted arms serve as supports for coils springs 14 and 15 and when the arms of one plate are connected with the arms of the other plate by bolts or rivets 16, as means for limiting the action of the springs.

The springs may be constructed as desired to withstand various forces and to yield under certain predetermined reaction forces. It, of course, being understood that the size of the spring will vary depending on the type and size of vehicle with which the braking mechanism is associated.

Figure 3:
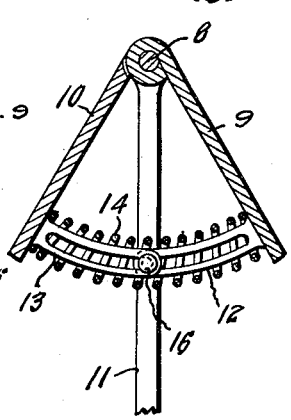
Figure 3 is a sectional view taken on line 3—3 of Figure 2.

When assembled the wedge 7 appears as shown in Figure 3; that is, plates 9 and 10 are arranged at a definite angle determined by the length of arms 12 and 13. It will be appreciated that as the wedge 7 is moved between the end faces 3' and 4' of the brake elements, the latter will be expanded or forced apart against the action of the contracting spring 6, and the lining 24 will be forced into engagement with the drum 2.

As the wedge is forced between the ends of the braking element, there will be a tendency for the springs 14 to contract, which will increase with the increased force applied to the brake pedal or lever. As the brake grabs, there will be a reaction against the actuating wedge 7 and, due to the construction of the wedge which permits it to collapse at a predetermined pressure, it will operate to release the braking element from the drum. After release there will, however, be a definite force applied to the braking element, which will act to retard the rotation of the drum. Thus, an even force will be applied to the braking element, which will insure an efficient braking effect without the disadvantageous grabbing or chattering.

In some instances it may be desirable to provide a wedge formed of plates which may be adjusted as to the angle normally existing therebetween so as to take up for wear. For instance, when the brake lining is thick, the ends of the braking element will be close together, and the angle between the plates 9 and 10 should be small enough to permit sufficient clearance to prevent the brake dragging. As the lining wears, the distance between the ends of the braking element increases, and it becomes necessary to increase the angle between plates 9 and 10 to effect sufficient engagement between the wedge and the ends of the braking element to secure the desired braking effect.

Figure 2:
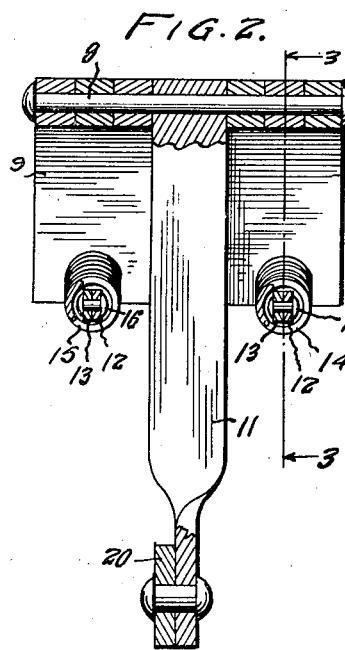
Figure 2 is an enlarged sectional view taken on line 2—2 of Figure 1 showing the construction of the collapsible actuating device.
Figure 4:
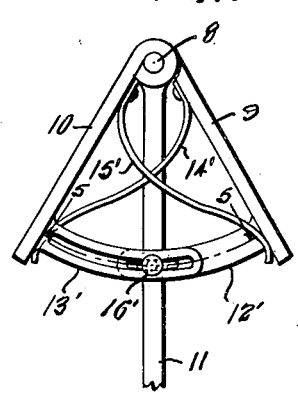
Figure 4 shows a modified form of the invention.
Figure 5:
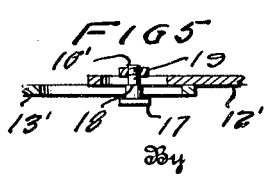
Figure 5 is a detailed sectional view taken on line 5—5 of Figure 4 showing the structure for adjusting the actuating device to compensate for wear of the brake lining.

There is shown in Figures 4 and 5 a modified form of the actuating wedge, which is capable of adjustment. This modified wedge, with exception of the arcuate slotted arms 12' and 13' and the springs 14 and 15, is constructed identical to that shown in Figures 1 to 3. In this form of my invention the means 16 for connecting the arms of one plate with those of another is in the form of a bolt fixed to one arm and slidable in a slot in the other arm. As clearly shown in Figure 5, a bolt 16' is provided with a portion 18 of increased diameter, which may be integral therewith or in the form of a sleeve or bushing. Arcuate arm 12' is provided with a slot, the width of which is equal to the smaller diameter of bolt 16', and arm 13' is provided with a slot having a width sufficient to slidably receive the enlarged portion 18 of bolt 16'. The bolt is passed through the slots in the arms 12' and 13' and is secured to arm 12' by means of the portion 18 and nut 19. Head 17 on bolt 16' serves to prevent the slotted arm 13' from becoming disconnected from arm 12'.

By securing bolt 16' at a definite position in the slot in arm 12' the maximum angularity of the wedge can be limited. With this construction the normal angularity of the vertex angle can be adjusted so that proper action can be had with either new or worn brake linings. To make the bolts 16' more accessible, leaf springs 14' and 15' are substituted for coil springs and are secured to plates 9 and 10 respectively. It, of course, is obvious that various other types of spring constructions may be employed.

Either form of wedge 7 may be actuated by any suitable type of the mechanism. A particular form found to be effective is shown in Figure 1 and consists of a lever 20 pivotally supported by the backing plate 23. One end of the lever is pivoted to link 11 and the other end is connected by a clevis to an operating cable 21 passing through guide 22 in plate 23.

As herein described, the wedge is associated with mechanism for forcing it vertically upward, but I wish it to be understood that my invention is not limited to the precise form shown.

The operation of the improved brake actuating mechanism will have been appreciated from the foregoing description. When the wedge is embodied in a brake construction and is forced between the ends of an expansible braking element, the latter is forced into engagement with the drum. If there is any tendency of the brake to grab, the wedge will collapse and thereby relieve the grip between the braking element and the drum.

While the releasable structure has been shown associated with the actuating device, I wish it to be clearly understood that it is also within the concept of this invention to associate the collapsible member with other portions of the brake structure.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

I claim:

1. A braking means comprising a drum, means to engage the drum for retarding rotation thereof and a resilient wedge for actuating the drum engaging means.

2. A vehicle brake comprising a drum mounted on a vehicle road wheel, brake shoes adapted to engage the interior of the drum, means for forcing the shoes into frictional engagement with the drum comprising a wedge, said wedge being collapsible when subjected to a predetermined operating force.

3. A brake mechanism comprising a rotatable drum, a braking element movable to engage the drum, means for actuating the braking element to resiliently force it into engagement with the rotatable drum, said means including a collapsible wedge.

4. A vehicle brake mechanism comprising a rotatable drum, a braking element movable to engage the drum, said element comprising a plurality of shoes adapted to be forced into engagement with the drum, a wedge comprising a plurality of pivotally connected members adapted to be forced into engagement with the braking elements and resilient means between the members.

5. A vehicle brake mechanism comprising a rotatable drum, a backing plate, brake shoes carried by the backing plate adapted to be forced into engagement with the rotatable drum, a wedge adapted to engage portions of the braking shoes for actuating the same, comprising a pair of pivoted members, means for limiting movement between said members and resilient means for retaining said members in a normal predetermined position.

6. A brake construction comprising a drum, an expansible shoe construction, a wedge for expanding said shoe construction, said wedge comprising a pair of plates pivotally mounted on an actuating link and means normally retaining the plates in a wedge-like position.

7. A brake construction comprising a drum, an expansible shoe construction, a wedge for expanding said shoe construction, said wedge comprising a pair of plates pivotally mounted on an actuating link and adjustable means carried by the plates for limiting relative movement therebetween.

8. A brake construction comprising a drum, an expansible shoe construction, a wedge for expanding said shoe construction, said wedge comprising a pair of plates pivotally mounted on an actuating link and resilient means carried by one plate and engaging with the other plate tending to retain the plates in wedge-like formation.

9. A vehicle braking mechanism comprising a rotatable drum, a backing plate, an expansible braking element carried by the backing plate, means for expanding said element comprising a link, members pivoted to the link adapted to engage portions of the braking element to force the same into engagement with the drum, resilient means mounted between the members, and means for actuating the link.

10. An actuating mechanism for vehicle brakes comprising a collapsible wedge-like member.

11. A vehicle brake construction comprising a brake drum, a braking element and collapsible wedge-like member directly engaging the element.

12. An actuating mechanism for vehicle brakes comprising a collapsible wedging member.

In testimony whereof I affix my signature.

RAYMOND J. NORTON.